Figure 1:
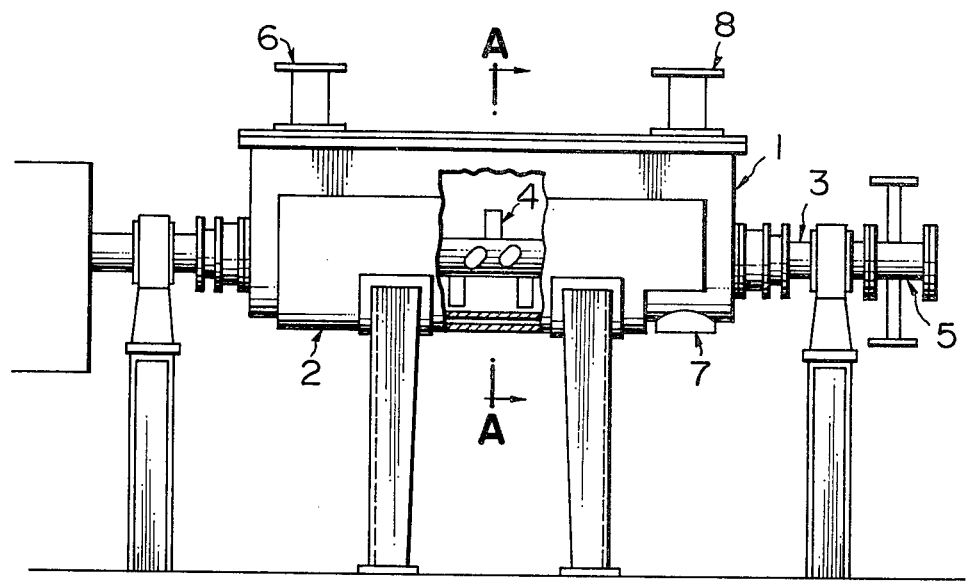

United States Patent [19]

Kato et al.

[11] 4,327,205

[45] Apr. 27, 1982

[54] BULK POLYCONDENSATION PROCESS FOR PRODUCING AROMATIC POLYESTERS

[75] Inventors: Yasuyuki Kato, Niihama; Haruo Suzuki, Ibaraki; Masatsune Kondo, Niihama; Hiroaki Sugimoto, Nara; Junichi Kimura; Zyunso Saito, both of Niihama, all of Japan

[73] Assignee: Sumitomo Chemical Company, Limited, Osaka, Japan

[21] Appl. No.: 224,881

[22] Filed: Jan. 14, 1981

[30] Foreign Application Priority Data

Jan. 24, 1980 [JP] Japan .................................. 55-7543

[51] Int. Cl.³ .............................................. C08G 63/22
[52] U.S. Cl. ...................................... 528/128; 528/173; 528/176
[58] Field of Search ......................... 528/128, 173, 176

[56] References Cited

U.S. PATENT DOCUMENTS 4,107,143 8/1978 Inata et al. ........................ 528/176
4,196,276 4/1980 Schreckenberg et al. .......... 528/176
4,287,332 9/1981 Jackson et al. ..................... 528/176

FOREIGN PATENT DOCUMENTS 2006239 5/1979 United Kingdom .

Primary Examiner—Lucille M. Phynes
Attorney, Agent, or Firm—Stevens, Davis, Miller & Mosher

[57] ABSTRACT

A process for producing by bulk polycondensation an aromatic polyester of the formula,

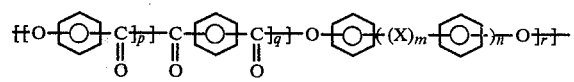

wherein X is a hydrocarbon radical having 1 to 20 carbon atoms, —O—, —SO$_2$—, —S—, or —CO—, m is 0 or 1 and n is 0 or 1; when p=0, q=r=an integer of 3 to 600; when q=r=0, p=an integer of 3 to 600; when p≠0, q≠0 and r≠0, p+q+r=3 to 600; p, q, r are integers and q=r, which comprises using a horizontal jacketed reactor provided with one or two agitator shafts bearing impellers fixed thereto and carrying out the bulk polycondensation in said reactor while circulating a heat-transfer medium through the jacket, agitator shaft(s), and, if necessary, impellers to heat or cool the reaction system to obtain a particulate material having a weight-average particle size of 0.5 to 20 mm.

2 Claims, 6 Drawing Figures

BULK POLYCONDENSATION PROCESS FOR PRODUCING AROMATIC POLYESTERS

This invention relates to a process for the production of aromatic polyesters in particulate form by bulk polycondensation. More particularly, it relates to a most rationalized process for the production of polyesters by bulk polycondensation, characterized by carrying out the polycondensation in one and the same reactor starting from a monomer (or monomers) until the intended polymer in particulate form is obtained.

Conventionally known polycondensation processes for producing aromatic polyesters include interfacial polymerization, suspension polymerization, solution polymerization and bulk polymerization. Of these processes, the bulk polymerization is the most rationalized one in view of the aftertreatment such as removal of the solvent or washing of the polymer and in view of the pollution loading of waste water. The process as applied to the production of oxybenzoly polyester is disclosed in U.S. Pat. Nos. 2,728,747 and 2,600,376; Journal of Applied Polymer Science, Vol. 2, No. 5, 198-202 (1959); Japanese Patent Publication Nos. 6,796/1971 and 37,357/1973. A process for the production of a copolyester comprising hydroxybenzoic acid is described in Japanese Pat. Publication No. 47,870/1972. The production process of oxybenzoyl polyester or copolyester by bulk polycondensation is well known. As described in detail in Journal of Applied Polymer Science, Vol. 2, No. 5 (1959) and Japanese Pat. Publication No. 37,357/1973, the bulk polycondensation has been carried out in the following way: The polycondensation is carried out at 300° C. under reduced pressure. As the polymerization proceeds, the melt viscosity of the polymerization system becomes higher and higher until stirring becomes no more effective. If the polymerizate is allowed to become a solid mass at this stage, the polymerization degree cannot be further increased. Accordingly, in order to increase the polymerization degree, the polymerizate, after cooling, is pulverized to a particle size of 0.8 mm and heated as such or heated in acetone to facilitate the crystallization. Such a process cannot be said to be advantageous on an industrial scale because of complicated procedure.

On the other hand, Japanese patent application Kokai (Laid-open) No. 46,291/1979 discloses a process for producing a solid polydispersion, in which in order to avoid caking of the polymerizate, the polymerization is conducted under application of a high shearing force to obtain a solid polydispersion of 0.5 mm or less in particle size. In the bulk polymerization for producing oxybenzoyl polyester and copolyester, since the melt viscosity increases with the process of polymerization, it would be effective to apply a shearing force to increase the mixing effect on the reaction mixture until the stage of polydispersion is reached. However, in the caking stage, where the stirring is no more effective, it will naturally require an extremely large power to apply a high shearing force sufficient to transform the polymerizate into particulate form. In a small scale equipment such a procedure may be practicable though in a strenuous way, but if it is attempted on a commercial scale, the stirring device will become a big one accompanying the problem of mechanical strength of materials. When a powerful stirring device is used to apply a large shearing force to the polymerizate in caking stage in order to produce a polymer in particulate form, there will occur considerable temperature gradient between the central part of the reactor and the reactor wall, resulting in non-uniformity of the molecular weight of the polymer which, in turn, will cause not only the deterioration in physical properties of the polymer but also the sintering of the once formed particulate polymer or the local decomposition of the polymer owing to the mechanical heat evolution, even when the polymerization temperature is lower than the sintering temperature of the polymerizate.

The present inventors conducted extensive investigations on the production of oxybenzoyl polyesters and copolyesters by bulk polycondensation with the intention of developing a commercially practicable process capable of producing a polycondensate in particulate form using but a small stirring power without applying a shearing force. This invention is an outcome of the above investigations.

The present inventors examined the mechanism of formation of particulate polymer from the reaction mixture during the course of polycondensation and, as a result, found that the application of a large shearing force is rather disadvantageous for the formation of particulate polymer, because the reaction mixture tends to become a solid mass owing to the compressive and densifying action of the shearing force and the transformation of this solid mass into particulate polymer requires an extremely large agitation power. For instance, if a polymerization reactor provided with an anchor-type impeller with a small clearance between the impeller and the polymerization reactor wall is used to carry out the polymerization under application of a large shearing force in order to produce a polymer in particulate form, the agitation power requirement for the impeller becomes as large as 30 to 50 kg.m/sec per kg of the polymer, resulting in the aforementioned problems or disadvantages. The reason for such an extremely large agitation power requirement seems to be such that the reaction mixture is subjected to shearing in a momentarily compressed state.

The present inventors unexpectedly found that in the polycondensation which yields an oxybenzoyl polyester or copolyester, it is possible to obtain very easily a polymer in particulate form without applying a large shearing force but applying a slight impact force.

This invention provides a polycondensation process for producing oxybenzoyl polyesters and copolyesters, which is characterized essentially by employing a specified reactor capable of making efficient use of an impact energy and producing easily a particulate polymer with a small consumption of the agitation power.

An object of this invention, therefore, is to provide a process in which the polycondensation for producing an oxybenzoyl polyester and copolyester is carried out throughout in a single reactor while imparting a stirring effect to the reactant mixture in an earlier stage where the melt viscosity of the polymerizate increases with the progress of polymerization and applying chiefly an impact force to the reaction mixture in the later caking stage to produce particulate polymer, and stirring the resulting particulate polymer to allow the polymerization to proceed uniformly, yielding a polymer in particulate form having a uniform polymerization degree.

To achieve the object of this invention, the present process employs a horizontal reactor provided with one or two agitator shafts with impellers fixed thereto and the reactant mixture is heated or cooled by circulating a heat-transfer medium through the jacket, agitator shaft and/or impellers; the agitation power is maintained at a value of 10 kg.m/sec or less per kg of the intended aromatic polyester product. According to this invention, an effective agitating action is maintained uniformly throughout the whole reaction system and there is obtained an oxybenzoyl polyester and copolyester in particulate form having a high polymerization degree and a weight-average particle size of 0.5 to 20 mm, the whole operation being very smooth.

The present process is a bulk polycondensation process for producing an aromatic polyester of the following formula:

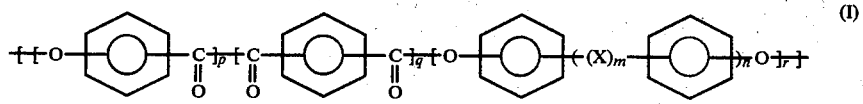
(I)

wherein X is a hydrocarbon radical having 1 to 20 carbon atoms, $-O-$, $-SO_2-$, $-S-$ or $-CO-$, m is 0 or 1 and n is 0 or 1; when $p=0$, $q=r=3$ to 600; when $q=r=0$, $p=3$ to 600, preferably $p=20-200$; and when $p \neq 0$, $q=0$ and $r \neq 0$, $p+q+r=3$ to 600, preferably $p+q+r=20$ to 200, provided that p, q and r are integers and $q=r$. The reaction scheme is represented by the following formula.

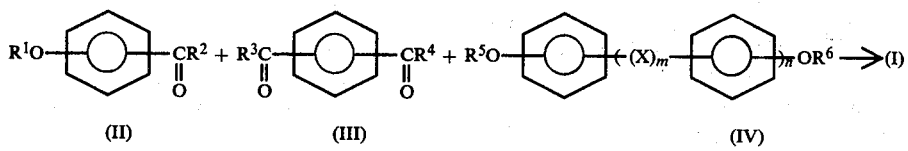

wherein m, n and X are as defined above, $R^1$, $R^5$ and $R^6$ are each a benzoyl group, a lower alkanoyl group, or a hydrogen atom and $R^2$, $R^3$, and $R^4$ are each a hydroxy group, a chlorine atom, a benzyloxy group, a lower alkoxy group, or a phenoxy group, and applicable to any polymerization reaction being capable of bulk polymerization.

Examples of the compounds represented by the formula (II) are p-hydroxybenzoic acid, m-hydroxybenzoic acid, phenyl p-hydroxybenzoate, phenyl m-hydroxybenzoate, p-acetoxybenzoic acid, m-acetoxybenzoic acid, isobutyl p-acetoxybenzoate, 3,5-dimethyl-4-hydroxybenzoic acid, phenyl 3,5-dimethyl-4-acetoxybenzoate, and phenyl 3,5-dimethyl-4-hydroxybenzoate.

Examples of the compounds represented by the formula (III) include isophthalic acid, terephthalic acid, 2-methylterephthalic acid, diphenyl terephthalate, diethyl isophthalate, methyl ethyl terephthalate, monoisobutyl terephthalate, terephthaloyl chloride, and isophthaloyl chloride.

Examples of the compounds represented by the formula (IV) include hydroquinone, resorcinol, diacetoxyresorcinol, 4,4'-biphenol, 4,4'-oxybiphenol, 4,4'-thiobiphenol, 4,4'-dihydroxydiphenyl sulfone, chlorinated hydroquinones, 2,2-bis(4-hydroxyphenyl)propane, 1,1-bis(4-hydroxyphenyl)cyclohexane, 1,1-bis(4-hydroxyphenyl)ethane, bis(4-hydroxyphenyl)methane, 2,2-bis(4-hydroxy-3,5-dibromophenyl)propane, 2,2bis-(4-hydroxy-3,5-dimethylphenyl)propane, 2,2-bis(4-hydroxy-3,5-dichlorophenyl)propane, and bis(4-hydroxy-phenyl)ketone.

The polyester condensation according to this invention can be carried out at about 200° to 400° C., preferably about 250° to 350° C. Since the rate of condensation reaction generally increases with the increase in temperature, it is desirable to carry out the condensation at comparatively high temperatures. The allowable maximum temperature depends partially upon the boiling point or decomposition point of the oligomer. Below this limiting temperature, the condensation is conducted at first at a comparatively low temperature and the temperature is elevated with the progress of condensation. The polymerization is carried out at first at a temperature of 180° to 250° C. under atmospheric or reduced pressure and then the temperature is elevated to 250° to 380° C., preferably 300° to 350° C. When the reaction mixture has been transformed into particulate form, it is possible to elevate the temperature, considering the sintering temperature and decomposition temperature, to 310° to 400° C., preferably 310° to 370° C. The rate of reaction becomes higher with the increase in temperature up to the decomposition and sintering temperatures.

A typical reaction time is generally about 1 to 10 hours. It can be shortened by the use of a catalyst, unless the polymer is adversely affected by the catalyst residue. Representative catalysts for use in the reaction include dialkyltin oxides (e.g. dibutyltin oxide), diaryltin oxides, titanium dioxide, alkoxytitanium silicates, titanium alkoxides, alkali and alkaline earth metal carboxylates, and gaseous acid catalysts such as Lewis acids (e.g. $BF_3$) and hydrogen halides (e.g. hydrogen chloride).

Stabilizers, coloring materials, fillers and the like can be added to the reaction system. As for the fillers, it is to be noted that the addition of a filler inert to the polymerization facilitates the formation of particulate polymer. In the case of a polymerization system which is difficult to form a particulate polymer, the object of this invention is easily achieved by the addition of a filler. Examples of fillers for use in the present process include silica, powdered quartz or sand, fumed silica, silicon carbide, aluminum oxide, glass fiber, tin oxide, iron oxide, zinc oxide, carbon, graphite, pigments such as titanium dioxide, other inorganic pigments and heat-resistant organic pigments.

An example of the batch-type reactor suitable for use in the present process is described below with reference to accompanying drawings, but the invention is not limited thereto.

FIG. 1 is a side view of a reactor assembly with a portion in sectional view. 1 is a reactor tank provided outside the bottom and side wall with a heating or cooling jacket 2 which may be undivided or divided in two or more sections to permit each section to be independently controlled in temperature. One or two agitator shafts 3 are disposed in reactor tank 1 (FIG. 1 shows the case of single shaft) with both ends extended to the outside to be supported on the supporting members and driven by a driving unit (not shown), e.g. a motor and driving gear. An impellers 4 are fixed to the shaft 3 so that one or more impeller blades are in a plane perpendicular to the shaft 3. Passages (not shown) of a heat-transfer medium are provided through the shaft 3 along the center line and, if necessary, inside the impellers. For the purpose of heating or cooling the agitator shaft 3 and the impeller 4, a heat-transfer medium such as air, steam or heat-transfer oil is supplied to the passage via a rotary joint 5 attached to one end of the shaft 4. The heat-transfer medium is also supplied likewise to the jacket 2 at the bottom and side to heat or cool the reactor tank 1. A feed inlet 6 for the raw materials is provided at one end of the tank 1 and a vent 8 for the gas liberated during the polycondensation reaction are provided at the other end.

Figure 2:
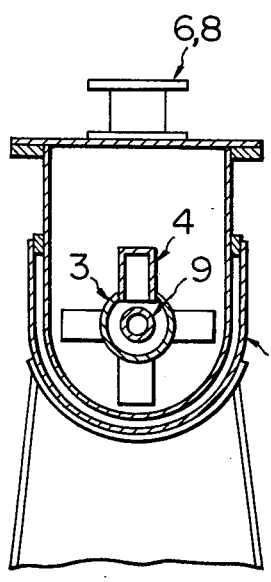
Figure 3:
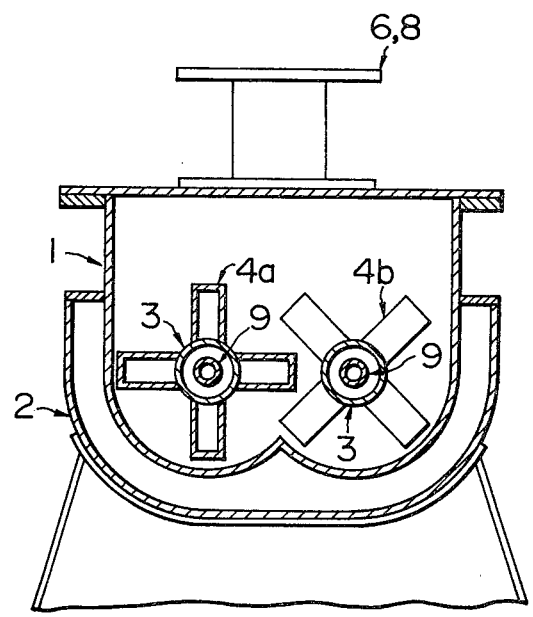

FIGS. 2 and 3 are cross-sections along the plane A—A as shown in FIG. 1, showing single and double agitator shafts, respectively. FIG. 3 shows two impellers 4a and 4b as well as a passage 9 of heat-transfer medium provided along the center line of shaft 3. The heat-transfer medium flows through the agitator shaft and the impeller in FIG. 2, while it flows through the agitator shaft in FIG. 3.

Figure 4:
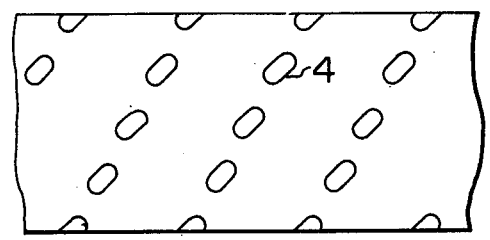
Figure 5:
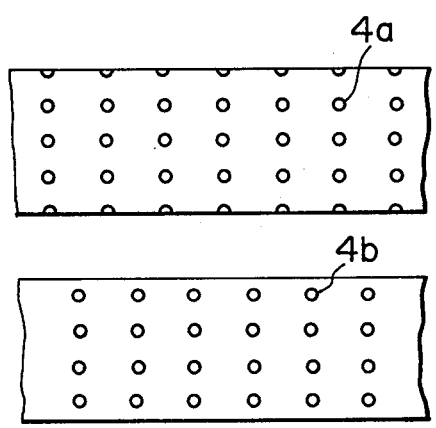

FIGS. 4 and 5 are developed views of impellers 4 as well as 4a and 4ib around the agitator shaft 3, corresponding to FIGS. 2 and 3, respectively.

In FIG. 4, impeller blades having an elliptical cross-section are fixedly arranged along lines running around the agitator shaft 3 obliquely to the center line of the shaft so that any plane perpendicular to the shaft contains one impeller blade. Such an arrangement allows the reaction mixture to move toward one end of the reactor tank or toward the other end in accordance with the direction of rotation of the shaft 3.

In FIG. 5, impeller blades 4a or 4b having a circular cross-section are fixed to each agitator shaft 3. Each group of four blades 4a is arranged around one shaft 3 in a plane perpendicular to the shaft. Another group of four blades 4b is arranged around the other shaft 3 in another plane perpendicular to the shaft. Thus, the blades 4a and 4b on two shafts rotate not in the same plane but in planes in alternate positions so that the groups of blades 4a and the groups of blades 4b may engage each other. In the cross-section perpendicular to the shaft, there is maintained a definite clearance between the free end of each blade and the tank wall or the surface of the other shaft or between the adjacent blades 4a and 4b of the respective shafts.

The present process is carried out by use of a reactor assembly as exemplified above and an aromatic polyester in particulate form is obtained by polycondensation with a small power requirement. The effectiveness of the present process and one of its embodiments are described below with reference to the reactor assembly exemplified above.

The starting materials for the aromatic polyester are charged from the feed inlet 6 provided at one end of the reactor tank 1. They may be solid, liquid or slurry or may contain inert solvents. The materials can be mixed just before feeding or fed each individually. The starting materials are heated by circulating a heat-transfer medium through the jacket 2, agitator shaft 3, and, in some cases, impeller blade 4. The heat-transfer medium can be circulated before the materials are charged. On being heated, the materials become mobile liquid or slurry. It is desirable that the amount of charge be such that the charge in mobile state will not completely cover the impeller blades.

In the case of a single-shaft reactor, the rotation of the shaft 3 may be unidirectional throughout the reaction until a particulate polymer is obtained, or the direction may be reversed at definite time intervals. In the case of a twin-shaft reactor, in which the impellers 4a and 4b may intermesh or not, the rotation of both shafts 3 may be co-directional or may be counterdirectional either inwardly or outwardly, as seen from above. The speed of rotation of both shafts may be the same or different. It is also possible to change the speed of rotation with the change in phase during the polycondensation reaction.

The charge in the reactor tank 1 is heated and forms a reaction mixture in the form of liquid or slurry. With the increase in temperature or the lapse of time, the polycondensation reaction proceeds and the charge becomes a viscous liquid or slurry. The mixing of the reaction system is effected by the convection caused by the rotating impellers 4. The gaseous by-products, vapor of the inert solvent and sublimates generated during the progress of polycondensation are purged from the reaction system through the vent 8. To facilitate the purge of the gases and sublimates, a jacket can be provided on the top of reaction tank 1 to circulate the heat-transfer medium.

With further progress of the polycondensation, the viscous liquid or slurry-like reaction mixture transforms into a semi-solid state. In this stage the convection is no more expectable. The semi-solid reaction mixture is lifted by the action of rotating impellers 4 and then drops down, thus developing an impact action between the polymerizate and the impellers 4 or the tank wall. Such an impact action transforms the polymerizate into the particulate form. In addition to the impact force, the drag generated in the sticky polymerizate when the impeller blade moves away from the position nearest to the tank wall and the friction between the particulates themselves as well as between the particulates and the larger lumps of polymerizate all contribute to the formation of a particulate polymer of the uniform size.

Since the polycondensation using the above reactor is precluded from an intensive shear, it might be anticipated that the polymerizate would move along with the impeller 4. However, as described above, it was unexpectedly found that a particulate polymer of the uniform size if obtained owing to the impact force, drag and frictional force exerted on or originated from the polymerizate. Moreover, it is surprising that substantially none of the polymer adheres to the tank wall or the surfaces of agitator shaft 3 or impellers 4. This seems to be due to the surface cleaning action of the particulate polymer which is formed.

After the polycondensation has proceeded to yield a particulate polymer, the polycondensation, if necessary, can be further advanced by elevating the temperature at a rate lower than the rate of increase in sintering temperature of the particulate polymer or by extending the reaction period. Thereafter, the product is cooled by decreasing the temperature of circulating heat-transfer medium and the completely particulate polymer is easily discharged through the opened delivery part 7 by rotating the agitator.

The reactor assembly and the mode of practicing the present process as described above relate to the batch-type operation. However, it is needless to say that the present process is not limited to the batch-type operation, but is applicable also to the continuous operation.

For the continuous operation, the quantity of the reaction mixture held in the reactor tank can be appropriately regulated by controlling the feed or the speed of rotation of agitator shaft 3 or by providing an overflow weir in front of the delivery port 7. Further, the configuration of the impeller can be changed at the position along the agitator shaft where the reaction system changes into molten state or semi-solid state. It is also feasible to incorporate into the reactor assembly a mechanism for the partial recycling of particulate polymer. The continuous system is generally preferred because of the steadiness in productivity and product quality or the ease of discharging the particulate polymer.

In the reactor according to this invention, the agitator shaft carries fixed impellers capable of exhibiting an effective impact effect. The profile of the impeller blade is not limited to a circle or an ellipse but may be triangular, square, rectangular, rhombic, trapezoidal or semicircular.

Irrespective of the type of blade profile, it is necessary to circulate a heat-transfer medium through the agitator shaft and is preferable to circulate also through the impeller. By such means the reaction mixture may be uniformly heated or cooled, a particulate polymer of a uniform polymerization degree may be obtained, and the temperature gradient between the central part of the reactor tank and the reactor wall may be practically eliminated. In the scale-up of the reactor, the surface areas of the agitator shaft and the impellers may be increased substantially proportionally to the increase in capacity of the reactor tank. It is desirable, therefore, to circulate a heat-transfer medium through the agitator shaft as well as the impeller in order to effectively remove the heat of reaction.

Regardless of the type of profile of the impeller blade, power requirement of the agitator shaft should be 10 kg.m/sec or less per kg of the polymer. If the power exceeds this limit, mechanical heat evolution will occur, which deteriorates the uniformity of the molecular weight and, hence, physical properties of the product polymer and, in addition, causes partial fusion or decomposition of the formed particulate polymer even at a temperature below the sintering temperature of the polymer. The power requirement exceeding the above limit is unfavorable for the scale-up of the reactor, because the agitating device will become too big and the strength of the agitator shaft will confront a problem.

There is no specific restriction on the clearance between the impeller and the reactor tank wall or, in the case of twin-shaft agitator, between the impeller of one shaft and the surface of the other shaft and between the impellers of one shaft and those of the other shaft. However, in view of the construction and maintainance of the device, a suitable clearance is in the range of about 5 to about 50 mm, which gives a particulate polymer having a weight-average particle size of 0.5 to 20 mm. A narrower clearance gives a weight-average particle size less than 0.5 mm but is undesirable in view of the construction and maintainance of the device. Reduction of the particle size to less than 0.5 mm requires a high shearing force exerted by the impeller, resulting in aforementioned disadvantages.

On the other hand, the aforementioned Japanese Patent Application Kokai (Laid-open) No. 46,291/1979 discloses that if the weight-average particle size exceeds 0.5 mm, the rate of polycondensation reaction in the subsequent stage markedly decreases, resulting in deterioration of the uniformity of molecular weight and physical properties of the polymer; and, in addition, the thermal conductivity becomes decreased, resulting in local overheating. To the contrary, it is surprising that according to this invention, so far as the weight-average particle size is less than 20 mm, the particulate polymer which is formed has a uniform molecular weight and, if necessary, can undergo further polycondensation in the reactor by elevating the temperature or by extending the reaction period. According to this invention, since the polycondensation proceeds at the same rate in the particulate polymer itself and in the rest of the reaction mixture, said rate being not lower than that in the preceding stage, it follows that the molecular weight of the resulting polymer is uniform, no deterioration in physical properties are caused, and there is neither decrease in thermal conductivity nor local overheating. The reason for such advantages of the present process seems to be the uniform heating or cooling of the reaction system within the reactor by the circulation of a heat-transfer medium through the agitator shaft and, if necessary, impellers.

This invention provides a bulk polycondensation process for producing an aromatic polyester represented by the aforementioned general formula, which comprises carrying out the bulk polycondensation in a jacketed horizontal reactor provided inside the reactor with one or two agitator shafts with impellers fixed thereto, while heating or cooling the reaction system by circulating a heat-transfer medium through the jacket, agitator shaft(s) and, if necessary, impellers and while exerting impact to the reaction mixture principally by the agitating impellers to obtain a particulate polycondensate having a weight-average particle size of 0.5 to 20 mm. As compared with a conventional process utilizing an intensive shear, the present process is more suitable for the commercial production and produces with less power requirement a particulate material having more uniform polymerization degree.

The type of profile and arrangement of the impeller for use in the reactor according to this invention are not specifically restricted so far as they are adapted to the condition that the agitation power is 10 kg.m/sec or less per kg of the polymer which is formed. An impeller through which a heat-transfer medium may be circulated is preferred. Unless the agitation power requirement exceeds 10 kg.m/sec accessories may be attached to the impeller and/or the reactor tank wall to enhance the mixing effect. In general, suitable tanks and impellers are those which are not a high-shear type and which exert substantially no shearing force to the reaction mixture, particularly to the polymer in semisolid form. For instance, it is preferable that, when the polymerizate moves by rotation of the impellers along the direction of rotation, the moving passage should not become substantially narrower as the polymerizate moves forward; the polymer is not forced to enter the clearance between the impeller and the tank wall; and the assembly of reactor tank and agitator is such that the semisolid polymer is transformed into particulate form without being subjected to a shearing force.

The invention is illustrated below in detail with reference to Examples, but the scope of this invention is not limited thereto.

In Examples the flow temperature of a polymer was determined by placing a polymer sample in a Kōka Flow Tester provided with a nozzle, 1 mm in orifice diameter and 10 mm in length, heating the sample under a load of 100 kg/cm$^2$ at a rate of 6° C./min. and recording the temperature (flow temperature) at which the sample flows out of the orifice at a rate of $5 \times 10^{-3}$ cc/sec.

The weight-average particle size of a parrticulate polymer was determined by using a set of standard sieves (JIS), and plotting the cumulative weight against the particle size. The weight-average particle size is the particle size corresponding to the cumulative weight of 50%.

EXAMPLE 1

A reactor as shown in FIGS. 1, 2 and 4 was used. The reactor tank was 1,250 mm in length, 300 mm in width and 450 mm in depth. The bottom was of a semicircular cross-section, 150 mm in radius. The top cover was provided with a looking window, a feed inlet and a vent. The delivery port for the product was at the bottom. Both sides and the bottom of the tank were jacketed. The tank was fitted with a single horizontal agitator shaft, 100 mm in diameter, carrying 28 fixed impeller blades. Each blade was elliptic in cross-section, 60 mm in major axis and 25 mm in minor axis; the plane including both axes was inclined to the central line of shaft at an angle of 45°. The arrangement of the blades was as follows: one blade in the plane perpendicular to the shaft; displacement of adjacent blades was 90°; distance between the center of blade was 38 mm; clearance between the free end of blade and the tank wall was 10 mm. A heat-transfer oil was circulated through the jacket, agitator shaft and impeller blades.

The reactor was charged with 35 kg of p-acetoxybenzoic acid. While passing nitrogen through the reactor, the agitator shaft was operated at 22 rpm and the direction of rotation was reversed at time intervals of 15 minutes. The temperature of the heat-transfer oil was elevated from room temperature to 300° C. over a period of 1.5 hours and kept at 300° C. for 2 hours to effect polycondensation. When the temperature of the heat-transfer oil had reached about 300° C., liberation of acetic acid was detected. After 1.3 hours from the beginning of heating, the material in the reactor became highly viscous and sticked to the shaft. After 1.5 hours from the beginning of heating, formation of particulate substance began to be observable. The whole material in the reactor transformed into uniform particulate substance in 2 hours at 300° C. The temperature of heat-transfer oil was then elevated to 350° C. over a period of one hour and the particulate substance was kept at this temperature for 3 hours. The heat-transfer oil was then cooled down to 150° C. There were obtained 21 kg of a particulate material having an average particle size of 2.2 mm. 90% of the particulate material had a particle size of 11.1 mm or less. There was no polymer adhered to the impeller or tank wall.

The agitation power requirement in this polycondensation was 2.2 kg.m/sec at maximum per kg of the particulate material which was formed. The maximum value was observed during the reaction at 300° C. for 2 hours. On differential thermal analysis of the obtained particulate material, the peak of heat absorption was observed during the reaction at 337° C. The weight loss on heating in the air at 370° C. for one hour was 0.5% by weight.

EXAMPLE 2

Into the same reactor as used in Example 1, were charged 25.9 kg of p-acetoxybenzoic acid, 11.9 kg of terephthalic acid and 19.4 kg of 4,4'-diacetoxybiphenyl. While passing nitrogen through the reactor, the agitator shaft was operated at 22 rpm and the direction of rotation was reversed at time intervals of 10 minutes. The temperature of the circulating heat-transfer oil was elevated from room temperature to 320° C. over a period of 2 hours and kept at this temperature for 4 hours to effect polycondensation. At the time when the temperature of the heat-transfer oil was elevated to 320° C., the material in the reactor was a low-viscosity slurry. After the temperature had reached 320° C., the vapor of liberated acetic acid hindered close observation of the reaction mixture. After about 3.5 hours from the time when the temperature had reached 320° C., observation of the mixture became possible and it was confirmed that the whole mixture had turned into a particulate material. A part of the particulate material, 4 to 5.66 mm in particle size, was withdrawn out of the reactor and tested for the flow temperature which was found to be 305° C.

The temperature of the heat-transfer oil was elevated to 350° C. over a period of 2 hours, kept constant at 350° C. for 3 hours, and decreased to 150° C. There were obtained 37 kg of a particulate material, 4.8 mm in average particle size, 92% of which had a particle size of 15.9 mm or below. There was no adhered polymer on the reactor wall and impeller. The maximum agitation power requirement was 5.2 kg.m/sec per kg of the particulate polymer which was obtained. This maximum value was recorded during the reaction period of 4 hours at 320° C. The particulate material was sorted by screening into three groups having respective particle size of 1–2 mm, 4–5.66 mm, and 11.1–15.9 mm. Upon testing, the flow temperatures were found to be 389°, 396° and 385° C., respectively, showing substantially no difference from one another owing to the particle size. Each group of the particle size was injection molded at 390° C. and tested for tensile properties. It was found that respective tensile strengths were 1,050, 1,140 and 1,080 kg/cm$^2$ respectively, and respective elongations were 3.3, 4.8 and 4.2%, showing substantially no difference from one another owing to the particle size.

EXAMPLE 3

The same reactor as used in Example 1 was charged with 18.4 kg of p-acetoxybenzoic acid, 8.5 kg of terephthalic acid and 13.8 kg of 4,4'-diacetoxybiphenyl. While passing nitrogen through the reactor, the agitator shaft was operated at 22 rpm and the direction of rotation was reversed at time intervals of each 10 minutes. A heat-transfer oil was circulated through the jacket, agitator shaft and impellers. The temperature of the heat-transfer oil was elevated from room temperature to 300° C. over a period of 2 hours and kept constant for 5 hours to effect polycondensation. At the time when the temperature of the heat-transfer oil was elevated to 300° C., the mixture in the reactor was a low-viscosity slurry. After the temperature had reached 300° C., the vapor of the liberated acetic acid hindered close observation of the reaction mixture. After having been kept at 300° C. for 5 hours, the heat-transfer oil was cooled down to 150° C. After cooling, observation of the contents of reactor confirmed that the whole reaction mixture had turned to a particulate material, 28 kg in weight. There was substantially no adhered polymer on the reactor wall and impellers. The agitation power requirement for the polycondensation was 4.7 kg.m/sec per kg of the particulate material which was obtained. No substantial increase in agitation power requirement was noticeable during the period of cooling from 300° C. down to 150° C.

The particulate material was screened and tested for the particle size distribution. The average particle size was 11 mm and 95% of the particulate material was of a particle size of 25.4 mm or below. Three classes of particulate material having respectively particle sizes of 4 to 5.66 mm, 11.1 to 15.9 mm and 19.1 to 25.4 mm were tested for flow temperatures which were found to be 297°, 290° and 295° C., respectively, indicating that the particle size has substantially no effect on the flow temperature.

COMPARATIVE EXAMPLE

Into the same reactor as used in Example 1, were charged p-acetoxybenzoic acid, terephthalic acid and 4,4'-diacetoxybiphenyl in the same amounts as in Example 3. While passing nitrogen through the reactor, the agitator shaft was operated at 22 rpm and the direction of rotation was reversed at time intervals of each 10 minutes. A heat-transfer oil was circulated through the jacket alone. The temperature of the heat-transfer oil was elevated from room temperature to 300° C. over a period of 2 hours and kept constant at 300° C. to effect polycondensation. At the time when the temperature of the heat-transfer oil was elevated to 300° C., the mixture in the reactor was a low-viscosity slurry. Even after the temperature had reached 300° C., close observation of the reaction mixture was capable because of little liberation of acetic acid vapor. Even 3 hours after the temperature had reached 300° C., the mixture was still a low-viscosity slurry. In the fourth hour after the temperature had reached 300° C., the mixture began to stick to the agitator shaft and impellers. In the sixth hour, the whole mixture had sticked to the shaft and impeller and rotated along with the rotation of the shaft. The reaction was continued by keeping the temperature at 300° C. Even after having been kept at 300° C. for 10 hours, the mixture remained as sticked to the shaft and rotated along with the shaft. The temperature of the heat-transfer oil was then decreased to 150° C. After cooling, inspection of the reactor revealed that the reaction mixture remained as sticked to the shaft and impeller and the rest of the mixture adhered all over the wall. No particulate matter was found. Upon testing the polymerizate adhered to the wall showed a flow temperature as low as 160° C., indicating that the polycondensation had not substantially proceeded.

EXAMPLE 4

The reactor employed was a stirred vessel of the twin-barrel type, 1,000 mm in length, 354 mm in width and 280 mm in depth, as shown in FIGS. 1, 3 and 5. The cross-section of the bottom showed two adjacent semi-circles, each 100 mm in radius. The top cover was provided with a looking window, feed inlet and vent. The delivery port was provided at the side. The bottom and both sides were jacketed. The vessel was fitted with two agitator shafts, 75 mm in diameter, carrying each 18 fixed impellers of four blades. The cross-section of each blade was circular, 22 mm in diameter. A plane perpendicular to the shafts includes 4 blades attached to one shaft and does not contain the blades attached to the other shaft. The distance between the blade centers was 54 mm. The blades are so arranged that the blades of one shaft and the blades of the other shaft may engage with each other. The clearance between the blade end and the vessel wall or the surface of another shaft, or the clearance between the blades of one shaft and the blades of the other shaft was 5 mm. A heat-transfer medium may be circulated through the jacket and the agitator shaft.

The above reactor was charged with 10.7 kg of p-acetoxybenzoic acid, 4.9 kg of terephthalic acid and 8.0 kg of 4,4'-diacetoxybiphenyl. While passing nitrogen through the reactor, the agitator shafts were counterrotated inwardly, as seen from above, at 12 rpm. A heat-transfer oil was circulated through the jacket and the agitator shafts. The temperature of the oil was elevated from room temperature of 300° C. over a period of 2 hours and kept constant at 300° for 5 hours to effect polycondensation. At the time when the temperature of the heat-transfer oil was elevated to 300° C., the mixture in the reactor was a low-viscosity slurry. After the temperature had reached 300° C., the vapor of the liberated acetic acid hindered close observation of the reaction mixture. After having been kept at 300° C. for 5 hours, the heat-transfer oil was cooled down to 150° C. After cooling, observation of the contents of reactor confirmed that the whole contents had turned to a particulate material the weight of which was 16 kg. There was substantially no adhered polymer on the reactor wall or impellers. The agitation power requirement for the polycondensation was 5.2 kg.m/sec at maximum per kg of the particulate material which was obtained. No substantial increase in agitation power requirement was noticeable during the period of cooling from 300° to 150° C.

The obtained particulate material was screened and tested for the particle size distribution. The average particle size was 5.6 mm and 97% of the particulate material was of a particle size of 15.9 mm or below. Three classes of the particulate material having respectively particle sizes of 1 to 2 mm, 4 to 5.66 mm and 11.1 to 15.9 mm were tested for flow temperatures which were found to be 292° C., 297° C. and 290° C., respectively, indicating that the particle size has substantially no effect on the flow temperature.

EXAMPLE 5

The same reactor as used in Example 4 was charged with 5.3 kg of p-acetoxybenzoic acid, 9.8 kg of isophthalic acid and 15.9 kg of 4,4'-diacetoxybiphenyl. While passing nitrogen through the reactor, the agitator shafts were counterrotated inwardly, as seen from above, at 12 rpm. A heat-transfer oil was circulated through the jacket and agitator shafts. The temperature of the oil was elevated from room temperature to 320° C. over a period of 2 hours and kept constant at 320° C. for 3 hours to effect polycondensation. At the time when the temperature of the heat-transfer oil was elevated to 320° C., the mixture in the reactor had already been in a high-viscosity state and the vapor of liberated acetic acid hindered close observation of the reaction mixture. After having been kept at 320° C. for 3 hours, the heat-transfer oil was cooled down to 150° C. After cooling, observation of the contents of reactor confirmed that the whole mixture had transformed to a particulate material, 21 kg in weight. There was substantially no adhered polymer on the reactor wall or impellers. The agitation power requirement for the polycondensation was 2.3 kg.m/sec at maximum per kg of the particulate material which was formed no substantial increase in agitation power requirement was noticed during the period of cooling from 320° to 150° C.

The particulate material was tested for the particle size distribution by screening. The average particle size was 2 mm and 93% of the particulate material was of a particle size of 11.1 mm or below. Three classes of the particulate material having particle sizes to 1 to 2 mm, 4 to 5.66 mm and 9.52 to 11.1 mm were tested for the flow temperatures which were found to be 360° C., 365° C. and 361° C., respectively, indicating that the particle size has substantially no effect on the flow temperature.

EXAMPLE 6

The same reactor as used in Example 4 was charged with 9.1 kg of p-hydroxybenzoic acid, 5.5 kg of terephthalic acid, 3.6 kg of hydroquinone and 16.2 kg of acetic anhydride. While passing nitrogen through the reactor, the agitator shafts were counterrotated at 12 rpm inwardly, as seen from above. A heat-transfer oil was circulated through the jacket and agitator shafts. The temperature of the oil was elevated from room temperature to 150° C. and kept constant at 150° C. for 3 hours to heat under reflux the mixture in the reactor. Thereafter, while removing acetic acid and acetic anhydride by distillation, the temperature of the heat-transfer oil was elevated to 250° C. to remove nearly completely the acetic acid liberated by the acetylation reaction as well as the unreacted acetic anhydride. After having been kept at 250° for two hours, the temperature of the heat-transfer oil was elevated to 320° C. over a period of one hour and kept constant at 320° C. for 3 hours to effect polycondensation. During the period of acetylation and polycondensation it was difficult to observe closely the mixture in the reactor. After having been kept at 320° C. for 3 hours, the heat-transfer oil was cooled down to 150° C. After cooling, observation of the contents of reactor confirmed that the whole mixture had transformed to a particulate material, 14.9 kg in weight. There was substantially no adhered material on the reactor wall or impellers. The agitation power requirement for the polycondensation was 2.5 kg.m/sec at maximum per kg of the particulate material which was obtained. No substantial increase in agitation power requirement was noticed during the period of cooling from 320° to 150° C.

The obtained particulate material was tested for the particle size distribution by screening. The average particle size was 5.3 mm and 93% of the particulate material was of the particle size of 15.9 mm or below. Three classes of the particulate material having particle sizes of 1 to 2 mm, 4 to 5.66 mm and 11.1 to 15.9 mm were tested for the flow temperatures which were found to be 353°, 347° and 350° C., respectively, indicating that the particle size has substantially no effect on the flow temperature.

What is claimed is:

1. A process for producing by bulk polycondensation an aromatic polyester of the formula,

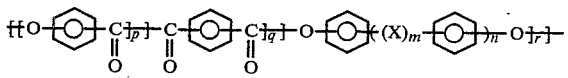

wherein X is a hydrocarbon radical having 1 to 20 carbon atoms, —O—, —SO$_2$—, —S—, or —CO—, m is 0 or 1 and n is 0 or 1; when p=0, q=r=an integer of 3 to 600; when q=r=0, p=an integer of 3 to 600; when p≠0, q≠0 and r≠0, p+q+r=3 to 600; p, q, r are integers and q=r, which comprises using a horizontal jacketed reactor provided with one or two agitator shafts bearing impellers fixed thereto and carrying out the bulk polycondensation in said reactor while circulating a heat-transfer medium through the jacket, agitator shaft(s), and, if necessary, impellers to heat or cool the reaction system to obtain a particulate material having a weight-average particle size of 0.5 to 20 mm.

2. A process according to claim 1, wherein the polycondensation is carried out while keeping the agitation power requirement at 10 kg.m/sec or less per unit weight (kilogram) of the aromatic polyester which is obtained.

* * * * *